United States Patent [19]

Petty et al.

[11] 4,446,010

[45] May 1, 1984

[54] FLUID CATALYTIC CRACKING

[75] Inventors: Randall H. Petty, Nederland; Burton H. Bartley, Port Arthur, both of Tex.

[73] Assignee: Texaco Inc., White Plains, N.Y.

[21] Appl. No.: 403,096

[22] Filed: Jul. 29, 1982

Related U.S. Application Data

[62] Division of Ser. No. 180,357, Aug. 22, 1980, Pat. No. 4,344,926.

[51] Int. Cl.³ .................... C10G 11/18; C10G 25/09
[52] U.S. Cl. .................................... 208/120; 423/244
[58] Field of Search .................... 208/120; 423/244 R

[56] References Cited

U.S. PATENT DOCUMENTS 4,146,463  3/1979  Radfod ............................ 208/164
4,344,926  8/1982  Petty et al. ....................... 252/464

OTHER PUBLICATIONS

Lowell et al., "Selection of Metal Oxides for Removal of $SO_2$ from Flue Gas", Ind. Eng. Chem, Proc. Des.-Dev., vol. No. 3, pp. 344-390.

*Primary Examiner*—Delbert E. Gantz
*Assistant Examiner*—Anthony McFarlane
*Attorney, Agent, or Firm*—Carl G. Ries; Robert A. Kulason; James J. O'Loughlin

[57] ABSTRACT

A fluid catalytic cracking process for sulfur-containing petroleum charge stocks wherein sulfur contained in coke deposited on the fluidized cracking catalyst in the reactor is converted to sulfur oxides in the regenerator and removed from regenerator off-gases by incorporating a composite of alumina and bismuth oxides in a particulate cracking catalyst. Sulfur oxides produced during regeneration of the catalyst by burning the coke with air in the regenerator are captured by the alumina-bismuth oxides composite and converted to hydrogen sulfide in the cracking reactor. The hydrogen sulfide so produced is readily separated from petroleum products of the catalytic cracking reaction process.

5 Claims, No Drawings

FLUID CATALYTIC CRACKING

This application is a division of application Ser. No. 180,357, filed Aug. 22, 1980 now U.S. Pat. No. 4,344,926.

The present invention relates to a process for fluid catalytic cracking of a hydrocarbon feedstock containing sulfur compounds. In one of its more specific aspects this invention relates to a process for removing gaseous sulfur compounds comprising sulfur oxides from gaseous mixtures in the presence of free oxygen with a particulate solid which comprises alumina in association with bismuth. In one of its more particular aspects, the invention relates to a method for the recovery of sulfur from an alumina-sulfur complex comprising bismuth by contacting said complex with hydrogen to form hydrogen sulfide.

It has been proposed heretofore to utilize alumina in particulate form as a vehicle for the removal of sulfur from gases containing sulfur oxides by forming a solid compound containing aluminum atoms and sulfur atoms and then contacting the solid compound with a hydrocarbon at a temperature of about 800° to 1300° F. to form hydrogen sulfide. The present invention represents an improvement over such processes. It has now been discovered that a composition comprising bismuth and alumina is more effective for the removal of sulfur oxides from gaseous mixtures than alumina alone or alumina in admixture with precious metal catalysts.

The removal of sulfur compounds from sulfur-containing gases by reaction with various solids including limestone, dolomite, and alumina are well known. The use of active particulate alumina for sulfur removal in a fluidized catalytic cracking unit has been disclosed in U.S. Pat. No. 4,071,436, wherein particulate alumina is physically admixed with a particulate cracking catalyst. The alumina reacts with sulfur oxides in the catalyst regeneration zone to form a solid compound containing sulfur, which, in turn, reacts with products of cracking in the fluidized catalytic cracking zone to form hydrogen sulfide. Hydrogen sulfide is discharged from the fluid catalytic cracking zone with the products of the catalytic cracking reaction and may be separated from the FCC products.

It has also been proposed heretofore, in U.S. Pat. Nos. 4,115,250 and 4,115,251, to provide a precious metal oxidation catalyst in admixture with a zeolite type cracking catalyst in a fluid bed catalytic cracking system for the removal of sulfur oxides from flue gases in the regeneration zone of a fluidized catalytic cracking unit. We have now found that an alumina-bismuth composition forming a part of the present invention is more effective for the removal of sulfur oxides from waste gases, such as flue gases from the regeneration zone of a fluidized catalytic cracking unit, than either active alumina, per se, or active alumina in combination with a carbon monoxide combustion promoter when employed in combination with a cracking catalyst consisting essentially of an amorphous silica-alumina matrix and a crystalline aluminosilicate zeolite.

The present invention relates to a process for removing sulfur oxides from gaseous mixtures containing oxides of sulfur by contacting said gaseous mixtures containing sulfur oxides at an elevated temperature and in the presence of free oxygen with a composition comprising alumina and bismuth at a temperature above about 500° C. forming a composite comprising alumina, bismuth, and sulfur, and thereafter regenerating the composition by contacting the alumina-bismuth-sulfur composite with hydrogen, optionally admixed with hydrocarbons, at an elevated temperature, above about 400° C., with the production of gaseous hydrogen sulfide.

One specific embodiment of the present invention comprises a fluid catalytic cracking process in which a composition of alumina and bismuth, preferably a composition comprising at least 90 weight percent active alumina and 0.1 to 10 weight percent bismuth is physically admixed in particulate form with particulate fluidized cracking catalyst, e.g. a Y zeolite in a silica-alumina matrix, and the resulting solids mixture circulated in a fluidized catalytic cracking unit. The solids mixture circulates in the fluidized bed catalytic cracking system from the cracking zone to the regeneration zone and back to the cracking zone. In the regeneration zone, the alumina-bismuth composition effects removal of gaseous sulfur compounds from the regeneration gas stream to form a composite comprising alumina, bismuth and sulfur, while in the cracking zone, the sulfur in the sulfur-alumina-bismuth composite reacts with hydrogen produced during cracking of hydrocarbons in the cracking zone to form hydrogen sulfide. The function of the alumina-bismuth composition is to capture sulfur from the gases present in the regenerator, carry the sulfur back into the cracking zone, and then convert the sulfur into hydrogen sulfide. Thus, the flue gases leaving the catalyst regenerator are cleaned up by the removal of sulfur compounds therefrom before they are discharged to the atmosphere and the sulfur values recovered as hydrogen sulfide in the catalytic cracking reactor. Hydrogen sulfide may be readily recovered in the usual processing facilities employed for the separation and treatment of products of catalytic cracking from sulfur-containing charge stocks.

The present invention represents an improvement over prior art processes employing alumina for this purpose in that the composition of alumina and bismuth of this invention is more active with respect to removal of sulfur oxides from gaseous mixtures than is alumina alone.

A carbon monoxide combustion promoter may be also included in the physical mixture of solids employed in a fluid catlytic cracking system, A number of suitable carbon monoxide combustion promoters are known in the art and are disclosed, for example, in U.S. Pat. No. 4,115,251. Such carbon monoxide combustion promoters are generally useful in fluid catalytic cracking processes and may be used in conjunction with the alumina-bismuth compositions of this invention.

In one of its broader aspects, the present invention comprises a process for the removal of a gaseous sulfur compound from a mixture of gases comprising sulfur oxides and free oxygen which comprises contacting said mixture of gases with a composite of alumina and bismuth.

The bismuth-alumina composition of the present invention is prepared by by the formation of a cojel of alumina and a soluble bismuth salt, e.g. bismuth nitrate, followed by drying of the gel, and crushing and sizing the dried gel, which may be further dried and calcined at 1000° to 1200° F. to produce a bismuth oxide-alumina composition in accordance with the present invention.

In a preferred embodiment of the process of this invention, a composite mixture of particulate solids comprising 1 to 10 weight percent of a composition of alumina and bismuth oxide, as described herein, and 90 to 99 weight-percent of a particulate zeolite cracking catalyst, comprising a Y zeolite in an alumina matrix, is employed in a fluidized bed catalytic cracking unit as described hereinabove. The bismuth-alumina composition may comprise 0.05 to 25 weight percent bismuth and 75 to 99.95 weight percent alumina. A preferred composition comprises 0.5 to 1 weight percent bismuth as the oxide on gamma alumina, which is a preferred embodiment of this invention is admixed with a Y zeolite cracking catalyst in relative proportions of about 10 weight percent bismuth oxide-alumina composition and 90 weight percent zeolite cracking catalyst.

Examples

A number of test runs were made to determine the effectiveness of the composition of the present invention for the removal of sulfur oxides in the regeneration of a commercial catalytic cracking catalyst contaminated with coke containing sulfur. The cracking catalyst employed in all of these tests was used catalyst taken from a commercial fluid catalytic cracking unit. The catalyst was comprised primarily of a product of Davison Chemical Division of W. R. Grace & Co., sold under the tradename "CBZ-1" as a high activity cracking catalyst comprising a Y-type synthetic crystalline zeolite in an amorphous alumina matrix. Physical properties of the catalyst as indicated by laboratory tests are reported in Table I.

TABLE I
CRACKING CATALYST

| Tests Results | |
|---|---|
| Surface Area, m$^2$/gm | 105 |
| Pore Volume cc/gm | 0.37 |
| Density, lb/ft$^3$ | |
| Aerated | 47.6 |
| Settled | 51.8 |
| Particle Size Distribution, wt. % | |
| 0–20$\mu$ | 0 |
| 20–40$\mu$ | 0 |
| 40–80$\mu$ | 22 |
| 80 + $\mu$ | 78 |
| Average Particle Size, $\mu$ | 86 |
| Alumina Content, wt. % | 37.7 |
| Sodium Content, wt. % | 0.41 |
| X-Ray Metals, wppm* | |
| Cu | 10 |
| Ni | 220 |
| Fe | 3330 |
| Cr | 310 |
| V | 370 |
| Zeolite Content, wt. % | 7.9 |

*parts per million by weight

Example 1

The cracking catalyst of Table I was tested in a reactor under typical catalytic cracking operating conditions in which a synthetic high sulfur gas oil containing 2.0 weight percent sulfur was made up of 90.6 wt.% dodecane, 1.0 wt.% hexene-1 and 8.4 wt.% benzothiophene, and subjected to catalytic cracking in a microreactor. Several test runs were conducted for each example and the data averaged to provide a basis for judging the effectiveness of various additives to the system to effect sulfur removal by capturing sulfur oxides from the regenerator flue gases. The runs were carried out at a cracking reaction temperature of 920° F. with a catalyst to oil ratio of 3:1 in a fixed bed reaction zone. The resulting catalyst, contaminated with coke containing sulfur, was regenerated with air in a fluidized bed regeneration zone at a temperature of 1240° F. Results of these tests are shown in Example 1 of Table IV.

Example 2

The cracking catalyst of Example 1 was admixed with 10 percent by weight of gamma alumina produced by calcining a high purity alpha alumina monohydrate marketed by Conoco Chemicals Division, Continental Oil Company, under the tradename "Catapal SB". The apha alumina monohydrate was converted to gamma alumina by calcining for three hours at 900° F. Properties of the alpha and gamma aluminas are indicated in Table II. This mixture was tested in 15 runs under conditions comparable to those of Example 1, and the data averaged. Results of these tests are shown in Example 2 of Table IV.

TABLE II

| | |
|---|---|
| Alumina content*, wt. % | 75% |
| Loss on Ignition, wt. % | 25% |
| Carbon*, wt. % | 0.3% |
| SiO$_2$*, wt. % | 0.008% |
| Fe$_2$O$_3$*, wt. % | 0.005% |
| Na$_2$O*, wt. % | 0.004% |
| Sulfur*, wt. % | 0.01% |
| Crystal Structure* | $\alpha$-alumina monohydrate |
| Crystal Structure** | $\gamma$-alumina |
| Surface Area (BET)** | 250 m$^2$/g |
| Pore Volume** | |
| 0–100 A | 0.49 cc/gm |
| 0–10,000 A | 0.53 cc/gm |
| Loose Bulk Density* | 43 lb/ft$^3$ |
| Particle Size Distribution* | 48% < 45$\mu$ |
| | 11% > 90$\mu$ |

*As received.
**After calcination for 3 hrs. at 900° F.

Example 3-5

Compositions containing 0.1, 0.5 and 1 percent bismuth on alumina were prepared and mixed with Table I cracking catalyst in relative proportions of 90 weight percent catalyst and 10 weight percent bismuth oxide-alumina composition and tested under conditions comparable to those of Example 1. Several tests runs were made with each of these compositions and the test data averaged. The averaged results of these tests are reported in Examples 3–5, respectively of Table IV.

In a preferred method of preparation of the composition of Example 5, 2.3 grams Bi (NO$_3$)$_3$.5H$_2$O were added to 100 milliliters distilled water after which 15 milliliters concentrated nitric acid were added to effect solution of the bismuth nitrate. The resulting solution was mixed into 132 grams of 60–200 mesh alpha alumina monohydrate of Table II to form a stiff gel. An additional 35 milliliters of distilled water were added to incorporate all of the powder into the gel. The resulting bismuth-alumina gel was air dried overnight at 300° F., crushed and sized to 60–200 mesh, then heated at 285° F. for one hour and at 1200° F. for two hours with stirring every half hour. The resulting composition contains 1 weight percent bismuth and 99 weight percent active alumina. This composition is then mixed with cracking catalyst of Table I in relative proportions of 90 weight percent catalyst and 10 weight percent bismuthalumina composition, and tested under conditions comparable to those of Example 1. Test results are included in Example 5 of Table IV.

Example 6

A four percent bismuth-alumina composition was prepared and admixed with cracking catalyst of Table I in relative proportions of 90 weight percent cracking catalyst and 10 weight percent of the alumina-bismuth oxide composition, tested in 12 test runs under conditions comparable to those of Example 1, and the test data averaged. The averaged results of these tests are shown in Table IV.

Example 7

Cracking catalyst of Table I was admixed with 60–200 mesh gamma alumina of Table II in relative proportions of 90 weight percent cracking catalyst, 9.94 weight percent alumina, and 0.06 weight percent of a platinum on alumina combustion promoter marketed commercially by Filtrol Corporation under the tradename "Filtrox H". Physical properties of this material are shown in Table III. The purpose of this example was to determine whether the use of a carbon monoxide combustion promoter would have any advantageous or adverse effects on the removal of sulfur from catalyst regeneration off-gases by combination of sulfur oxides with alumina. Seven test runs were carried out with this combination of cracking catalyst, active alumina, and carbon monoxide combustion promoter under conditions comparable to those of Example 1. The averaged results of these tests are shown in Table IV.

TABLE III

| CO COMBUSTION PROMOTER | |
|---|---|
| Description | Results |
| X-Ray Metals, wppm* | |
| Cu | < 10 |
| Ni | 40 |
| Fe | 4100 |
| Cr | 70 |
| V | 170 |
| Particle Size Distribution | |
| 0–20μ | 0 |
| 20–40μ | 12 |
| 40–80μ | 64 |
| 80 + μ | 24 |
| Average particle size, μ | 64 |
| Surface Area, m²/gm | 110 |
| Pore Volume, cc/gm | 0.33 |
| Density, lb/ft³ | |
| Aerated | 50.4 |
| Compacted | 58.8 |
| Alumina Content, wt. % | 76.7 |
| Silica Content, wt. % | — |
| Sodium Content, wt. % | 0.09 |
| Platinum, wppm | 2300 |

*parts per million by weight

TABLE IV

| Example | Catalyst | Sulfur Oxides[1] (Wt. % Feed Sulfur) | Average[2] % Decrease |
|---|---|---|---|
| 1 | FCC Catlayst | 4.2 ± 0.5 | — |
| 2 | FCC Cat. 90%/Al₂O₃ 10% | 1.6 ± 0.3 | 62 |
| 3 | FCC Cat. 90%/(0.1% Bi + Al₂O₃) 10% | 1.3 ± 0.2 | 69 |
| 4 | FCC Cat. 90%/(0.5% Bi + Al₂O₃) 10% | 1.1 ± 0.1 | 74 |
| 5 | FCC Cat. 90%/(1% Bi + Al₂O₃) 10% | 1.1 ± 0.2 | 74 |
| 6 | FCC Cat. 90%/(4% Bi + Al₂O₃) 10% | 1.4 ± 0.2 | 67 |
| 7 | FCC Cat. 90%/Al₂O₃ 9.94%/CO Combustion Promoter 0.06% | 1.6 ± 0.3 | 62 |

[1] Sulfur oxides in regenerator flue gas.
[2] Percentage decrease in sulfur oxides in regenerator flue gas.

It will be evident from the foregoing examples that bismuth-alumina compositions of the present invention are more effective for the removal of sulfur oxides from gaseous mixtures than alumina alone or mixtures of alumina and precious metal carbon monoxide combustion promoters.

We claim:

1. In a fluid catalytic cracking process wherein a sulfur-containing hydrocarbon charge stock is contacted with a fluidized particulate cracking catalyst at a temperature in the range of from about 800° F. to about 1300° F. producing normally liquid hydrocarbon products of said cracking reaction and a sulfur-containing coke deposit on said catalyst, spend coke-contaminated catalyst is regenerated by contacting said spent catalyst with an oxygen-containing gas in a catalyst regeneration zone effecting burning of said sulfurcontaining coke and heating of said catalyst to a temperature in the range of about 1000° F. to about 1500° F. with the production of regeneration gases comprising oxides of carbon and sulfur, and resulting regenerated catalyst is returned to said cracking zone, the improvement which comprises incorporating a minor portion of a particulate solid composite of alumina and bismuth oxide containing 0.1 to 4 weight percent bismuth with said catalyst in an amount sufficient to provide 0.01 to 0.04 weight percent bismuth in the resulting mixture.

2. A fluid catalytic cracking process according to claim 1 wherein said composite is prepared by forming a cojel of a bismuth oxide and alumina, drying said cojel, crushing and sizing said dried cojel to particle sizes in the range of 60–200 mesh, and calcining the dried particles.

3. A fluid catalytic cracking process according to claim 1 wherein said cracking catalyst contains 90 weight percent of said cracking catalyst and 10 weight percent of said composite of active alumina and bismuth oxides.

4. A fluid catalytic cracking process according to claim 1 wherein said catalyst composition comprises an effective amount of a carbon monoxide combustion promoter.

5. A fluid catalytic cracking process according to claim 4 wherein said combustion promoter comprises platinum or a platinum compound.

* * * * *